(12) United States Patent
Osaka (10) Patent No.: US 8,427,119 B2
(45) Date of Patent: Apr. 23, 2013

(54) POWER SOURCE APPARATUS (75) Inventor: Shohei Osaka, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 547 days.

(21) Appl. No.: 12/693,827

(22) Filed: Jan. 26, 2010

(65) Prior Publication Data

US 2010/0225286 A1 Sep. 9, 2010

(30) Foreign Application Priority Data

Mar. 6, 2009 (JP) ................................ 2009-053211

(51) Int. Cl.
*G05F 3/16* (2006.01)
(52) U.S. Cl.
USPC ............................................. 323/224; 363/97
(58) Field of Classification Search .......... 323/222–224, 323/282–285, 288–290; 363/16–17, 89, 363/97, 98
See application file for complete search history.

(56) References Cited

U.S. PATENT DOCUMENTS

| 5,861,734 | A | * | 1/1999 | Fasullo et al. | 323/222 |
| 5,905,369 | A | * | 5/1999 | Ishii et al. | 323/272 |
| 6,084,790 | A | * | 7/2000 | Wong | 363/71 |
| 7,035,119 | B2 | * | 4/2006 | Koike | 363/19 |
| 7,038,924 | B2 | * | 5/2006 | Wu | 363/89 |
| 7,151,364 | B2 | * | 12/2006 | Kimura et al. | 323/282 |
| 8,125,203 | B2 | * | 2/2012 | Ayukawa et al. | 323/272 |

FOREIGN PATENT DOCUMENTS

JP 2007-195282 8/2007

OTHER PUBLICATIONS

U.S. Appl. No. 12/705,257, filed Feb. 12, 2010, Osaka.

* cited by examiner

*Primary Examiner* — Rajnikant Patel
(74) *Attorney, Agent, or Firm* — Oblon, Spivak, McClelland, Maier & Neustadt, L.L.P.

(57) ABSTRACT

A power source apparatus includes a first converter having a reactor L1, a switching element Q1, and a rectifier D1; a second converter connected in parallel with the first converter and having a reactor L2, a switching element Q2, and a rectifier D2; a capacitor C1 connected to output ends of the first and second converters; a current detector R1 detecting a resultant current of currents of the first and second converters; a controller 13 driving the switching element Q1 and the switching element Q2; and a selector. In a case where the resultant current indicates a first reference value, if one of first and second drive signals of the controller is active, the active drive signal is deactivated, and if both the first and second drive signals are active, one of the first and second drive signals that is active longer than the other is deactivated.

4 Claims, 11 Drawing Sheets

POWER SOURCE APPARATUS

BACKGROUND OF THE INVENTION

1. Field of the Invention

The present invention relates to a power source apparatus, and particularly, to a controller in the power source apparatus.

2. Description of the Related Art

Figure 1:
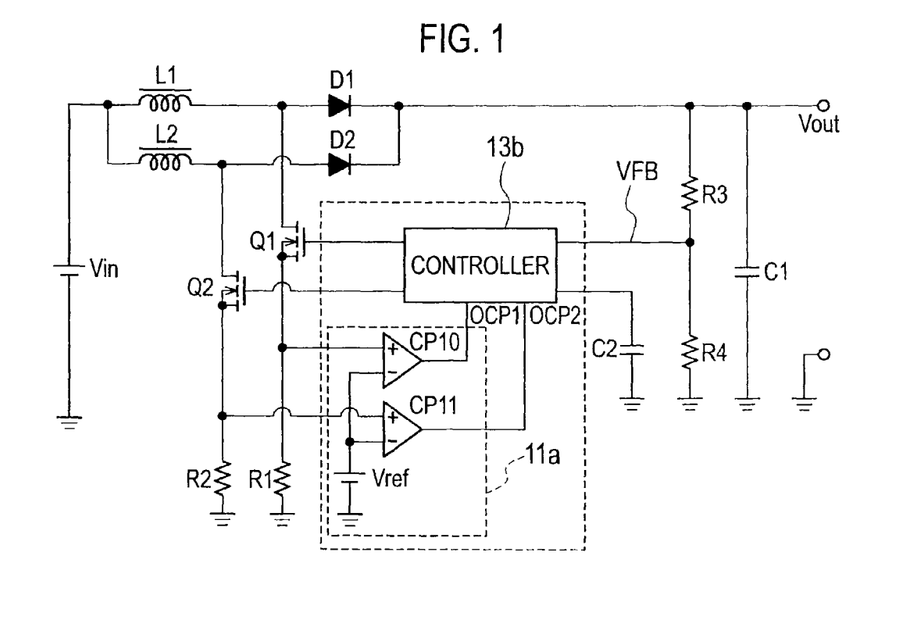
FIG. 1 is a circuit diagram illustrating a power source apparatus according to a related art.

FIG. 1 is a circuit diagram illustrating a power source apparatus according to a related art. In FIG. 1, an input power source Vin is a DC power source whose both ends are connected to a first series circuit including a step-up reactor L1, a switching element Q1 made of a MOSFET, and a current detecting resistor R1. Both ends of the series-connected switching element Q1 and current detecting resistor R1 are connected to a rectifying-smoothing circuit including a rectifying element D1 and a smoothing capacitor C1. The step-up reactor L1, switching element Q1, current detecting resistor R1, and rectifying element D1 constitute a first converter.

Both ends of the input power source Vin are also connected to a second series circuit including a step-up reactor L2, a switching element Q2 made of a MOSFET, and a current detecting resistor R2. Both ends of the series-connected switching element Q2 and current detecting resistor R2 are connected to a rectifying-smoothing circuit including a rectifying element D2 and the smoothing capacitor C1. The step-up reactor L2, switching element Q2, current detecting resistor R2, and rectifying element D2 constitute a second converter.

Both ends of the smoothing capacitor C1 are connected to a series circuit including resistors R3 and R4. This series circuit forms an output voltage detector that detects a voltage at a connection point of the resistors R3 and R4 and provides an output voltage signal VFB.

According to the output voltage signal VFB, a controller 13b turns on/off gates of the switching elements Q1 and Q2 to control a voltage across the smoothing capacitor C1 to a constant value.

Figure 2:
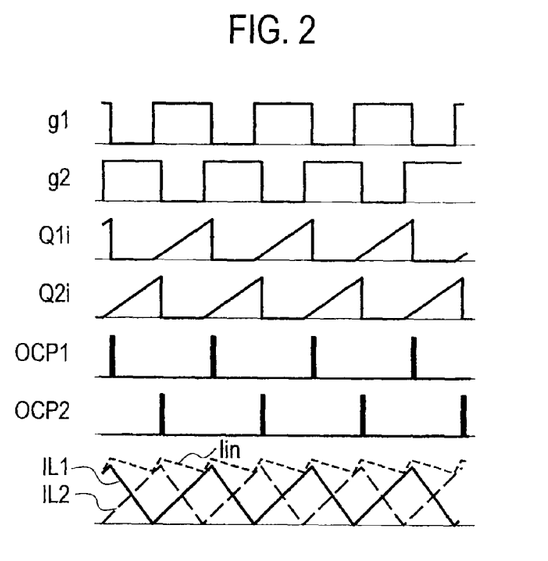
FIG. 2 is a view illustrating operating waveforms at various parts of the power source apparatus of FIG. 1.

FIG. 2 illustrates operating waveforms at various parts of the power source apparatus of FIG. 1. In FIG. 2, a signal g1 is a drive signal for the switching element Q1, g2 is a drive signal for the switching element Q2, Q1$i$ is a drain current of the switching element Q1, Q2$i$ is a drain current of the switching element Q2, OCP1 is an overcurrent detection signal of the switching element Q1, OCP2 is an overcurrent detection signal of the switching element Q2, IL1 is a current passing through the step-up reactor L1, IL2 is a current passing through the step-up reactor L2, and Iin is a current passing through the input power source Vin.

Operation of the power source apparatus of FIG. 1 will be explained with reference to FIG. 2.

The controller 13b outputs the drive signals g1 and g2 to drive the switching elements Q1 and Q2. When the switching element Q1 is ON, the current Q1$i$ passes in a clockwise direction through a path extending along Vin, L1, Q1, R1, and Vin, to accumulate flux energy in the step-up reactor L1. When the switching element Q1 changes from ON to OFF, the flux energy accumulated in the step-up reactor L1 causes a current passing in a clock wise direction through a path extending along Vin, L1, D1, C1, and Vin, to charge the smoothing capacitor C1.

When the switching element Q2 is ON, the current Q2$i$ passes in a clockwise direction through a path extending along Vin, L2, Q2, R2, and Vin, to accumulate flux energy in the step-up reactor L2. When the switching element Q2 changes from ON to OFF, the flux energy accumulated in the step-up reactor L2 causes a current passing in a clockwise direction through a path extending along Vin, L2, D2, C1, and Vin, to charge the smoothing capacitor C1.

The controller 13b controls the switching elements Q1 and Q2 so that a phase difference of 180 degrees is produced between the switching elements Q1 and Q2. This reduces current ripples of the input power source Vin and smoothing capacitor C1.

An overcurrent detector 11a includes comparators CP10 and CP11 and a reference voltage Vref. If a voltage across the current detecting resistor R1 becomes equal to or higher than the reference voltage Vref, the overcurrent detector 11a determines that the current detecting resistor R1 is passing an overcurrent and outputs the overcurrent detection signal OCP1 to the controller 13b. If a voltage across the current detecting resistor R2 becomes equal to or higher than the reference voltage Vref, the overcurrent detector 11a determines that an excess current is passing through the current detecting resistor R2 and outputs the overcurrent detection signal OCP2 to the controller 13b.

Receiving the overcurrent detection signals OCP1 and OCP2 from the overcurrent detector 11a, the controller 13b stops the drive signals g1 and g2 to the gates of the switching elements Q1 and Q2, thereby limiting currents to the step-up reactors L1 and L2 within a predetermined range. This results in limiting currents to the switching elements Q1 and Q2 within a predetermined range.

The related art must arrange the current detecting resistor for each of the converters connected in parallel with each other. In addition, the related art must arrange, for each converter, the comparator in the overcurrent detector 11a. As results, the related art increases circuit scale and costs in proportion to the number of the parallel-connected converters.

Figure 3:
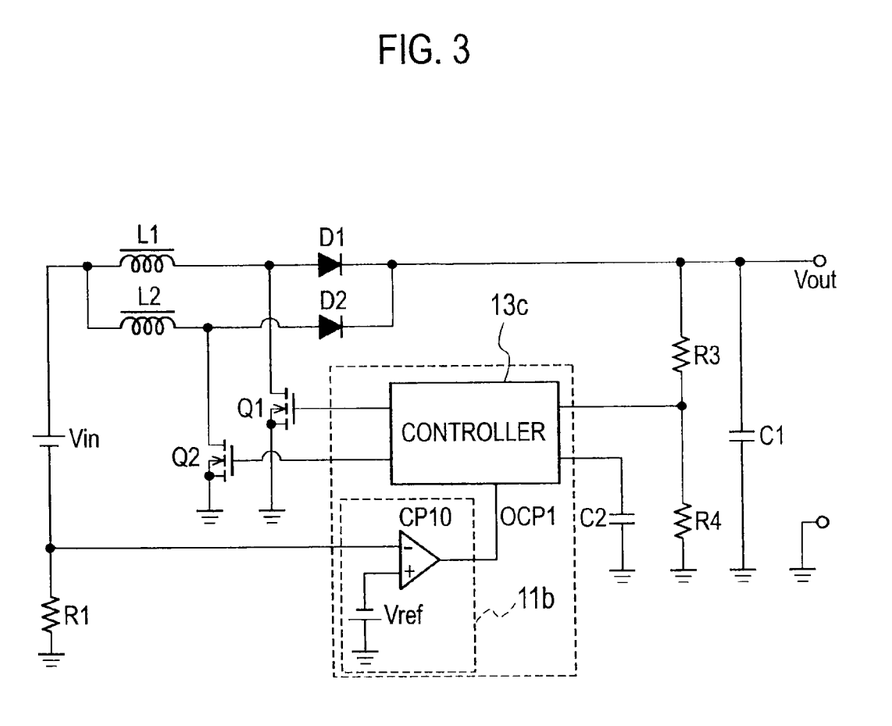
FIG. 3 is a circuit diagram illustrating a power source apparatus according to another related art.

FIG. 3 is a circuit diagram illustrating a power source apparatus according to another related art. The power source apparatus of FIG. 3 differs from the power source apparatus of FIG. 1 in that it connects a current detecting resistor R1 between a negative terminal of an input power source Vin, removes the current detecting resistor R2, and employs an overcurrent detector 11b. The remaining configuration of FIG. 3 is the same as that of FIG. 1.

FIGS. 4A to 4D illustrates operating waveforms of various parts of the power source apparatus of FIG. 3. In FIGS. 4A to 4D, OCP1 is an overcurrent detection signal related to currents passing through step-up reactors L1 and L2. The other reference marks depicted in FIGS. 4A to 4D are the same as those illustrated in FIG. 2. Operation of the various parts illustrated in FIGS. 4A to 4D is basically the same as that of FIG. 2.

The overcurrent detector 11b includes a comparator CP10 and a reference voltage Vref. If a voltage across the current detecting resistor R1 becomes equal to or lower than the reference voltage Vref, the overcurrent detector 11b determines that an overcurrent is passing through the current detecting resistor R1 and outputs the overcurrent detection signal OCP1 to a controller 13c. Receiving the overcurrent detection signal OCP1, the controller 13c stops drive signals g1 and g2 to switching elements Q1 and Q2.

Duty ratios of the drive signals g1 and g2 are controlled according to an input voltage, an output voltage, output power, and the like. If the ON duty ratio of each drive signal is 50% or smaller, the drive signals for the switching elements Q1 and Q2 do not overlap each other.

Figure 4A:
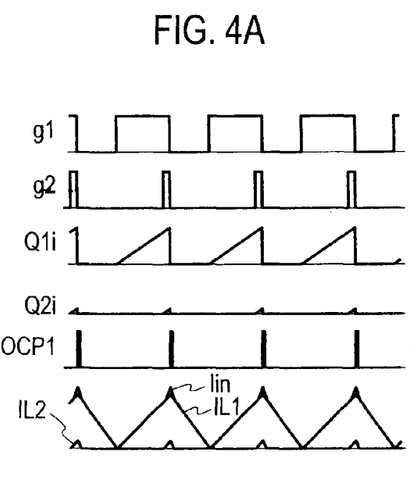
FIGS. 4A to 4D are views illustrating operating waveforms at various parts of the power source apparatus of FIG. 3.
Figure 4B:
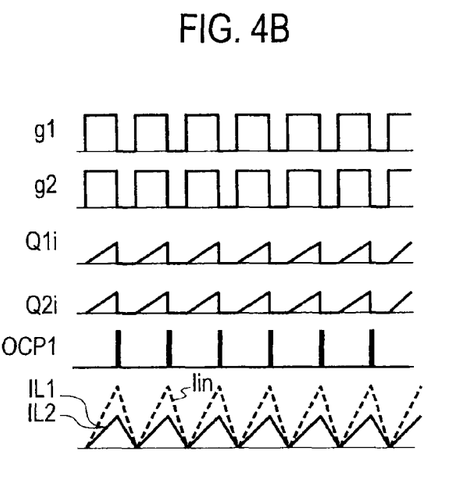
Figure 4C:
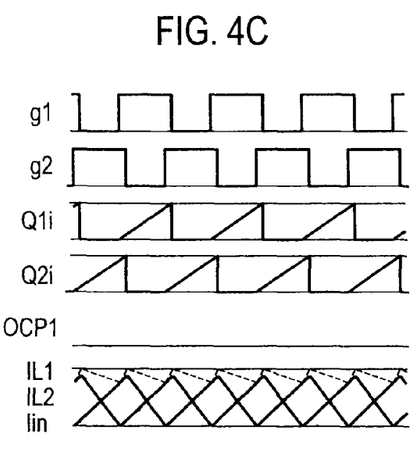
Figure 4D:
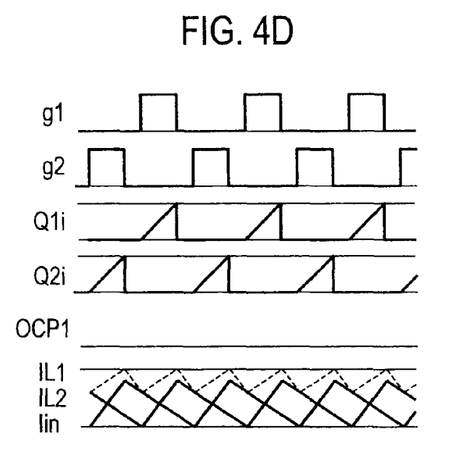

If the ON duty ratio of each drive signal exceeds 50% as illustrated in FIG. 4C, the drive signals for the switching elements Q1 and Q2 partly overlap. If an overcurrent is detected in the overlapping period, the controller 13c is unable to determine which of the drive signals must be stopped.

If both the switching elements Q1 and Q2 are stopped, a large difference occurs between the ON periods of the switching elements Q1 and Q2, to cause a large difference between currents passing through the switching elements Q1 and Q2 as illustrated in FIG. 4A.

There is another problem illustrated in FIG. 4B. A current value before the overcurrent protective operation is halved after the overcurrent protective operation. To cope with this problem, the phase difference between the switching elements Q1 and Q2 may be nullified at the start of the overcurrent protective operation, to improve the current reduction ratio to about 0.7 of the value before the overcurrent protective operation. The current reduction, however, is unable to eliminate.

A related art is disclosed in, for example, Japanese Unexamined Patent Application Publication No. 2007-195282.

SUMMARY OF THE INVENTION

The power source apparatus according to the related art of FIG. 1 must provide each switching element with a current detecting resistor, to correctly and stably carry out an overcurrent protective operation.

Namely, the power source apparatus of FIG. 1 must arrange a current detecting resistor for each of converters that are connected in parallel with each other, and in addition, the controller 13b must have terminals for the current detecting resistors, respectively. These factors increase the cost of the power source apparatus.

The present invention provides a power source apparatus capable of stably carrying out an overcurrent protective operation at low cost.

According to a first aspect of the present invention, the power source apparatus includes a first converter having a first reactor, a first switching element, and a first rectifying element, the first reactor being connected to a power source; parallel converters each having the same configuration as the first converter and connected in parallel with the first converter, the number of the parallel converters being at least one; an output capacitor connected to output ends of the first and parallel converters; a current detector configured to detect a resultant current of currents passing through the first and parallel converters; a controller connected to the first and parallel converters and configured to output a first drive signal for driving the first switching element of the first converter and drive signals for driving the switching elements of the parallel converters; and a deactivate unit. If the resultant current indicates a first reference value and if one of the drive signals for the switching elements of the first and parallel converters is active, the deactivate unit deactivates the active drive signal. If the resultant current indicates the first reference value and if a plurality of the drive signals for the switching elements of the first and parallel converters are active, the deactivate unit deactivates at least one of the active drive signals that is active longer than the other active drive signals.

According to a second aspect of the present invention, the deactivate unit is configured to, if the resultant current indicates a second reference value that is different from the first reference value, deactivate all of the drive signals for the switching elements of the first and parallel converters without regard to whether or not the drive signals are active.

DESCRIPTION OF THE PREFERRED EMBODIMENTS

Power source apparatuses according to embodiments of the present invention will be explained in detail with reference to the drawings.

Embodiment 1

Figure 5:
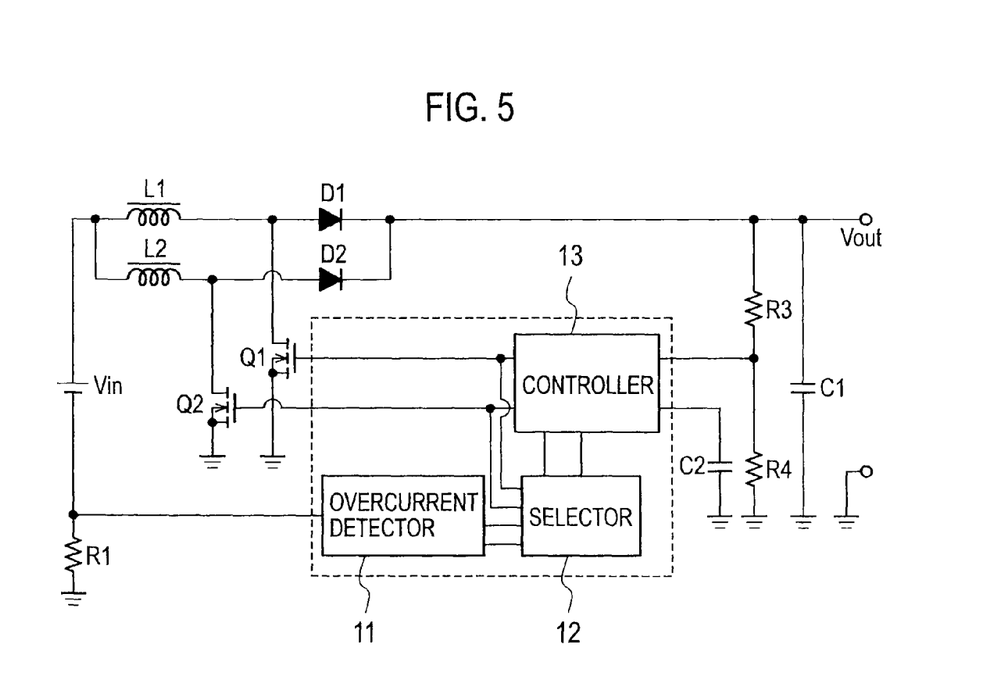
FIG. 5 is a circuit diagram illustrating a power source apparatus according to Embodiment 1 of the present invention.

FIG. 5 is a circuit diagram illustrating a power source apparatus according to Embodiment 1 of the present invention. The power source apparatus of Embodiment 1 differs from the related art of FIG. 3 in that Embodiment 1 employs a selector 12. The remaining configuration of Embodiment 1 is substantially the same as that of the related art of FIG. 3.

Figure 6:
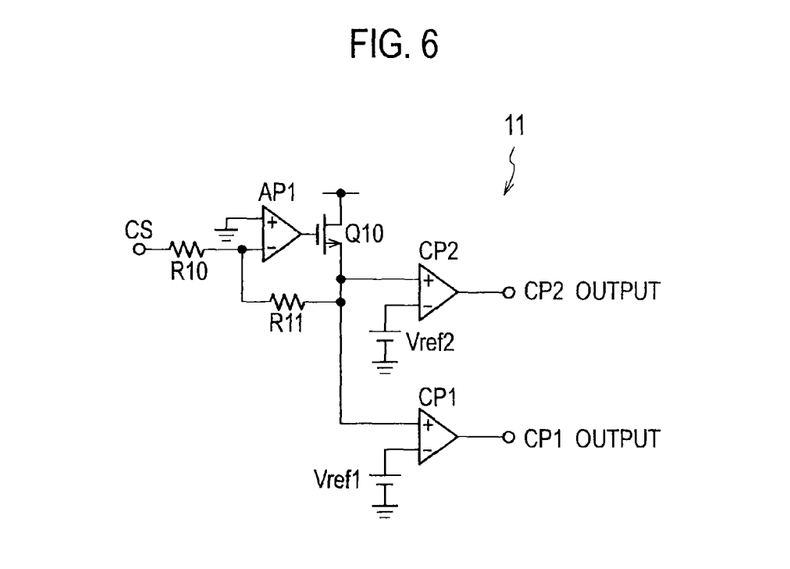
FIG. 6 is a circuit diagram illustrating an overcurrent detector in the power source apparatus of Embodiment 1.

An overcurrent detector 11 detects if an overcurrent passes through a current detecting resistor R1. FIG. 6 is a circuit diagram illustrating the overcurrent detector 11 in the power source apparatus of Embodiment 1.

In FIG. 6, the overcurrent detector 11 has an inverting amplifier that includes resistors R10 and R11, an operational amplifier AP1, and a MOSFET Q10. An output of the inverting amplifier is connected to a non-inverting input terminal of a comparator CP1. An inverting input terminal of the comparator CP1 is connected to a first reference voltage Vref1. The output of the inverting amplifier is also connected to a non-inverting input terminal of a comparator CP2. An inverting input terminal of the comparator CP2 is connected to a second reference voltage Vref2. An output of the comparator CP1 and an output of the comparator CP2 are connected to the selector 12.

The current detecting resistor R1 provides a negative voltage signal varying proportional to an input current signal. The negative voltage signal is inverted and amplified by the inverting amplifier into a positive voltage signal.

The comparator CP1 compares the positive voltage signal from the inverting amplifier with the first reference voltage Vref1, and if the positive voltage signal is equal to or larger than the first reference voltage Vref1, provides a high-level output to indicate an overcurrent state. If the positive voltage signal is lower than the first reference voltage Vref1, the comparator CP1 provides a low-level output to indicate a normal state.

The comparator CP2 compares the positive voltage signal from the inverting amplifier with the second reference voltage Vref2, and if the positive voltage signal is equal to or larger than the second reference voltage Vref2, provides a high-level output to indicate an overcurrent state. If the positive voltage signal is lower than the second reference voltage Vref2, the comparator CP2 provides a low-level output to indicate a normal state.

The selector 12 corresponds to the deactivate unit stipulated in the claims. The selector 12 receives the two overcurrent state signals CP1 and CP2 from the overcurrent detector 11, a first drive signal g1 for driving the switching element Q1, and a second drive signal g2 for driving the switching element Q2, and if it is an overcurrent state, deactivates the drive signal corresponding to the switching element that is operating longer than the other switching element. Namely, the selector 12 stops the operation of the switching element corresponding to the deactivated drive signal.

Figure 7:
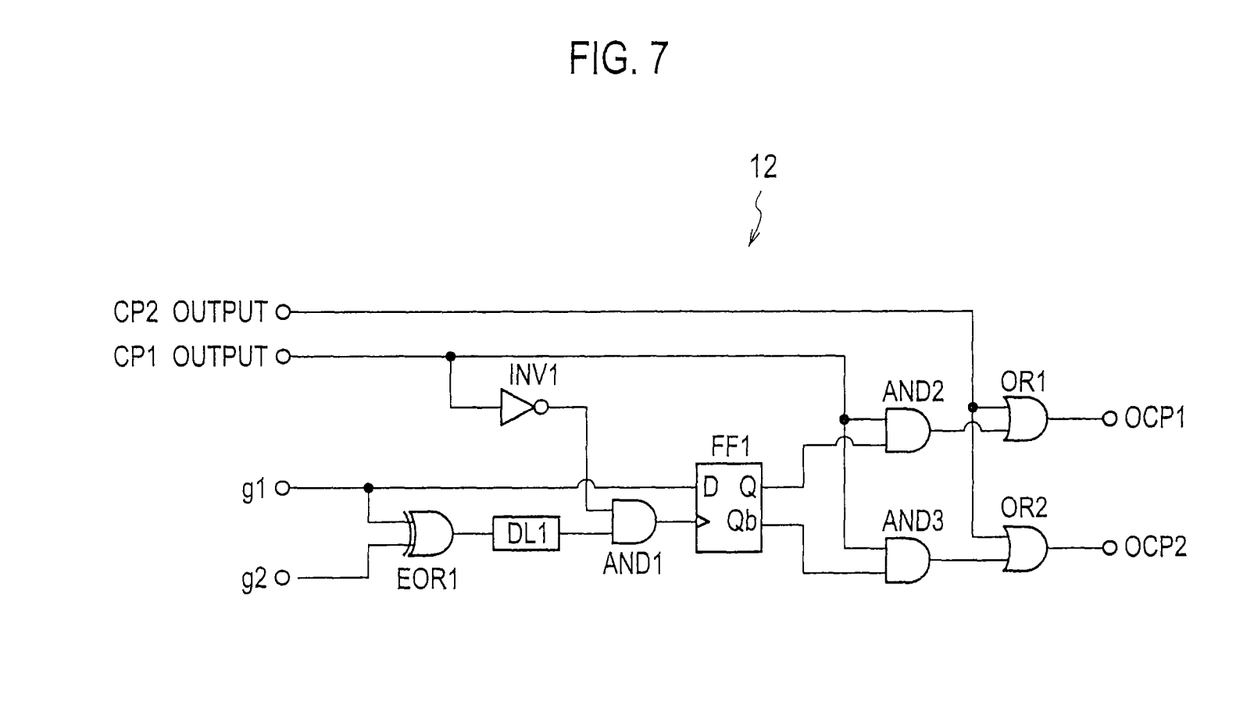
FIG. 7 is a circuit diagram illustrating a selector in the power source apparatus of Embodiment 1.

FIG. 7 is a circuit diagram illustrating the selector 12 in the power source apparatus of Embodiment 1 In FIG. 7, the selector 12 has an inverter INV1, an exclusive OR (EOR) gate EOR1, a delay circuit DL1, AND gates ADN1 to AND3, a D-flip-flop FF1, and OR gates OR1 and OR2.

The EOR1 finds an EOR of the first and second drive signals g1 and g2. The delay circuit DL1 delays an EOR output from the EOR1 by a predetermined time and outputs the delayed signal to a first input terminal of the AND1.

The inverter InV1 inverts an output from the comparator CP1 of the overcurrent detector 11 and outputs the inverted signal to a second input terminal of the AND1. An output terminal of the AND1 is connected to a clock input terminal of the D-flip-flop FF1. A D-input terminal of the D-flip-flop FF1 receives the first drive signal g1.

The AND2 finds an AND of the output from the comparator CP1 and an output Q from the D-flip-flop FF1. The AND3 finds an AND of the output from the comparator CP1 and an inverted output Qb of the D-flip-flop FF1.

The OR1 finds an OR of an output from the comparator CP2 and an output from the AND2 and outputs the first overcurrent detection signal OCP1. The OR2 finds an OR of an output from the comparator CP2 and an output from the AND3 and outputs the second overcurrent detection signal OCP2.

Figure 8:
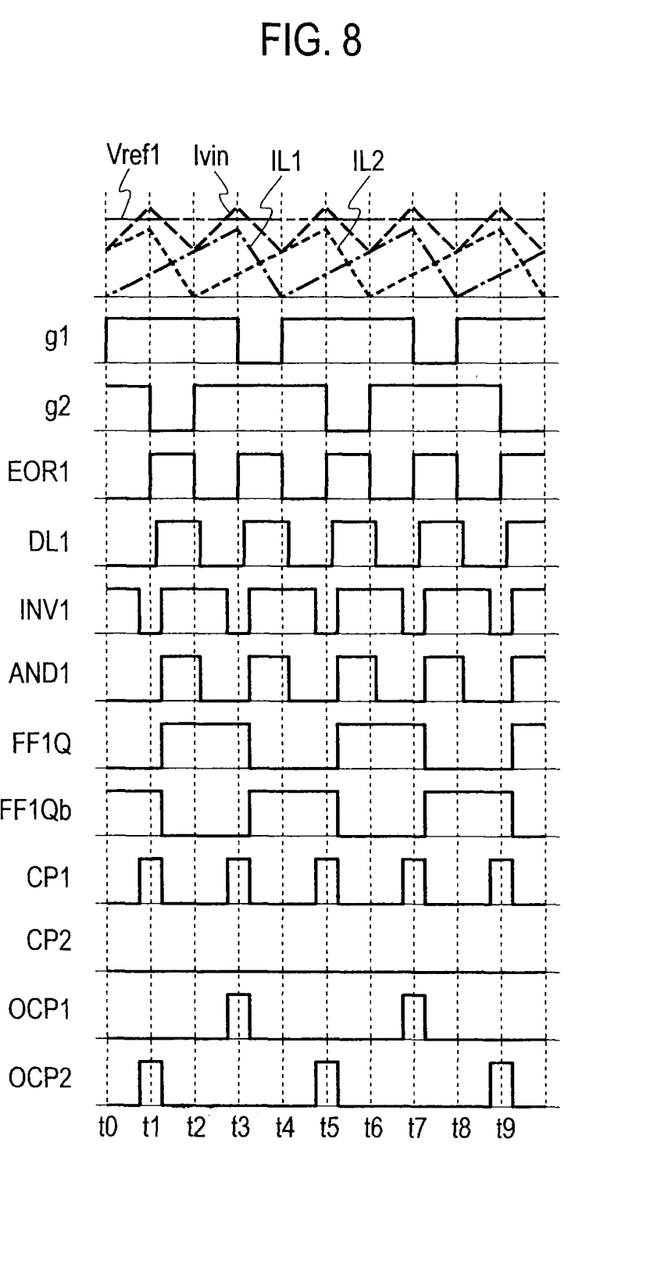
FIG. 8 is a view illustrating operating waveforms at various parts of the overcurrent detector and selector in the power source apparatus of Embodiment 1.

FIG. 8 is a view illustrating operational waveforms at various parts of the overcurrent detector 11 and selector 12 in the power source apparatus of Embodiment 1.

In FIG. 8, a signal g1 is the first drive signal for driving the switching element Q1, g2 is the second drive signal for driving the switching element Q2, EOR1 is an output signal from the EOR1, DL1 is an output signal from the delay circuit DL1, INV1 is an output signal from the inverter INV1, AND1 is an output signal from the AND1, FF1Q is an output signal from the D-flip-flop FF1, FF1Qb is an inverted output signal from the D-flip-flop FF1, CP1 is an output signal from the comparator CP1 of the overcurrent detector 11, CP2 is an output signal from the comparator CP2 of the overcurrent detector 11, OCP1 is a first output signal from the selector 12, and OCP2 is a second output signal from the selector 12.

Operation of the overcurrent detector 11 and selector 12 of Embodiment 1 will be explained with reference to FIG. 8. In FIG. 8, the drive signals g1 and g2 each have a duty ratio of 50% or over. The converters have different phases from each other.

If only one of the first and second drive signals g1 and g2 is active (for example, from t1 to t2, from t3 to t4, from t5 to t6, and from t7 to t8), the EOR1 provides a high-level output. Namely, if the first and second drive signals g1 and g2 provide pulses that do not overlap each other, the EOR1 provides an exclusive OR signal of high level.

The delay circuit DL1 delays the signal EOR1 by a predetermined time and provides the delayed signal DL1. The inverter INV1 inverts the output CP1 from the comparator CP1 and outputs the inverted signal INV1 to the AND1.

The AND1 finds an AND of the inverted signal INV1 and the delayed signal DL1 and outputs the signal AND1. Namely, the signal AND1 is obtained by masking the delayed signal DL1 for an overcurrent detection period (the high-level period of the comparator output signal CP1). The signal AND1 is supplied to the clock input terminal of the D-flip-flop FF1.

The D-flip-flop FF1 stores a logical voltage state of the first drive signal g1 applied to the D-input terminal in synchronization with the signal AND1 applied to the clock input terminal.

When one of the first and second drive signals g1 and g2 becomes active, the D-flip-flop FF1 gives priority to the active drive signal and keeps the priority of the active drive signal until one of the first and second drive signals g1 and g2 again becomes active. If the output Q of the D-flip-flop FF1 is high, the first drive signal g1 is in an active state longer than the second drive signal g2.

The comparator CP1 detects an overcurrent state according to a resultant current of input currents of the first and second converters. Accordingly, the detected overcurrent state contains an overcurrent state of the first converter and/or an overcurrent state of the second converter.

For this, the AND2 and AND3 find ANDs of the comparator output signal CP1 indicative of the states of both the converters and the output signals from the D-flip-flop FF1. This results in weighting the overcurrent probabilities of the first and second converters. Then, one of the overcurrent state signals OCP1 and OCP2 corresponding to the first and second converters is provided.

If the comparator CP2 of the overcurrent detector 11 detects an overcurrent state, all converters are deactivated without regard to the output states of the D-flip-flop FF1. To achieve this, the selector 12 outputs both the overcurrent state signals OCP1 and OCP2 to the first and second converters.

In this way, the overcurrent detector 11 of the power source apparatus according to Embodiment 1 outputs the overcurrent state signal CP1 if a resultant current signal from the current detecting resistor R1 reaches the reference voltage Vref1. The selector 12 receives the overcurrent state signal CP1, and if both the first and second drive signals g1 and g2 are active at this time (for example, from t2 to t3 in FIG. 8), outputs the overcurrent state signals OCP1 and OCP2 according to output signals from the D-flip-flop FF1. For example, in the period from t2 to t3, the overcurrent state signal OCP1 is outputted because the output Q of the D-flip-flop FF1 is high.

Figure 9:
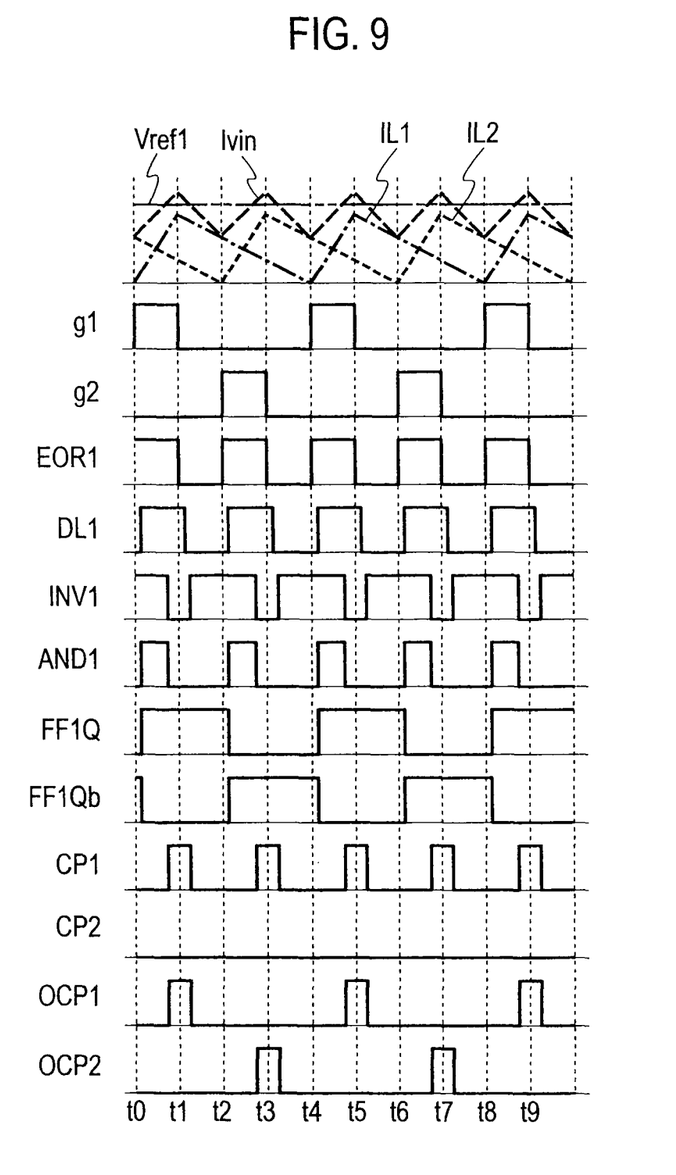
FIG. 9 is a view illustrating other operating waveforms at the various parts of the overcurrent detector and selector in the power source apparatus of Embodiment 1.

FIG. 9 is a view illustrating operating waveforms at the various parts of the overcurrent detector 11 and selector 12 in the power source apparatus of Embodiment 1 when the ON duty ratio of each drive signal is lower than 50%. If only one of the first and second drive signals g1 and g2 is active (for example, only the second drive signal g2 is active in a period from t2 to t3 in FIG. 9), the overcurrent state signals OCP1 and OCP2 are outputted according to outputs from the D-flip-flop FF1. For example, in the period from t2 to t3, the overcurrent state signal OCP2 is outputted because the output Qb from the D-flip-flop FF1 is high.

In this way, the overcurrent protective operation according to Embodiment 1 identifies a switching element that is in an active state for a longest period among operating switching elements and the identified switching element becomes inoperative accordingly. The power source apparatus according to Embodiment 1, therefore, stably performs the overcurrent protective operation at low cost.

Embodiment 2

Figure 10:
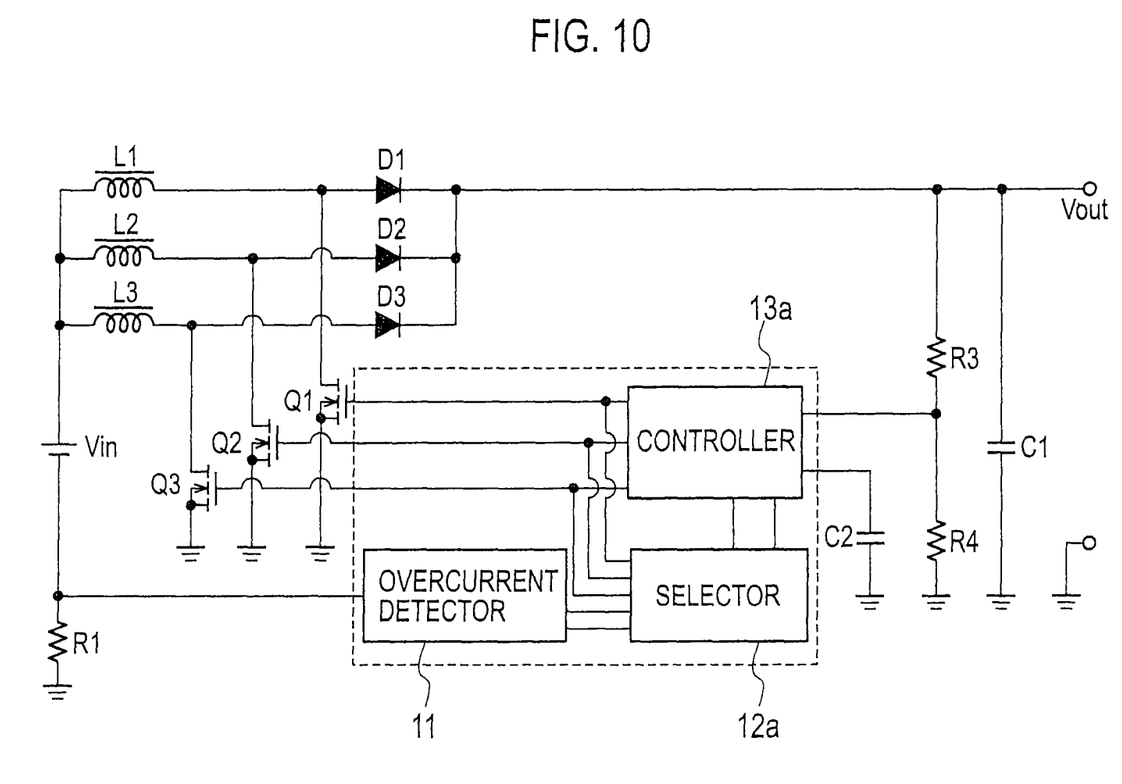
FIG. 10 is a circuit diagram illustrating a power source apparatus according to Embodiment 2 of the present invention.

FIG. 10 is a circuit diagram illustrating a power source apparatus according to Embodiment 2 of the present invention. In addition to the power source apparatus of Embodiment 1, the power source apparatus of Embodiment 2 has a third converter that includes a step-up reactor L3, a rectifying element D3, and a switching element Q3 being a MOSFET. The remaining configuration of the power source apparatus of Embodiment 2 is the same as that of Embodiment 1 illustrated in FIG. 5.

To operate the three converters connected in parallel with each other, a controller 13a of Embodiment 2 sets a phase difference of about 120 degrees among drive signals for driving switching elements of the converters.

Figure 11:
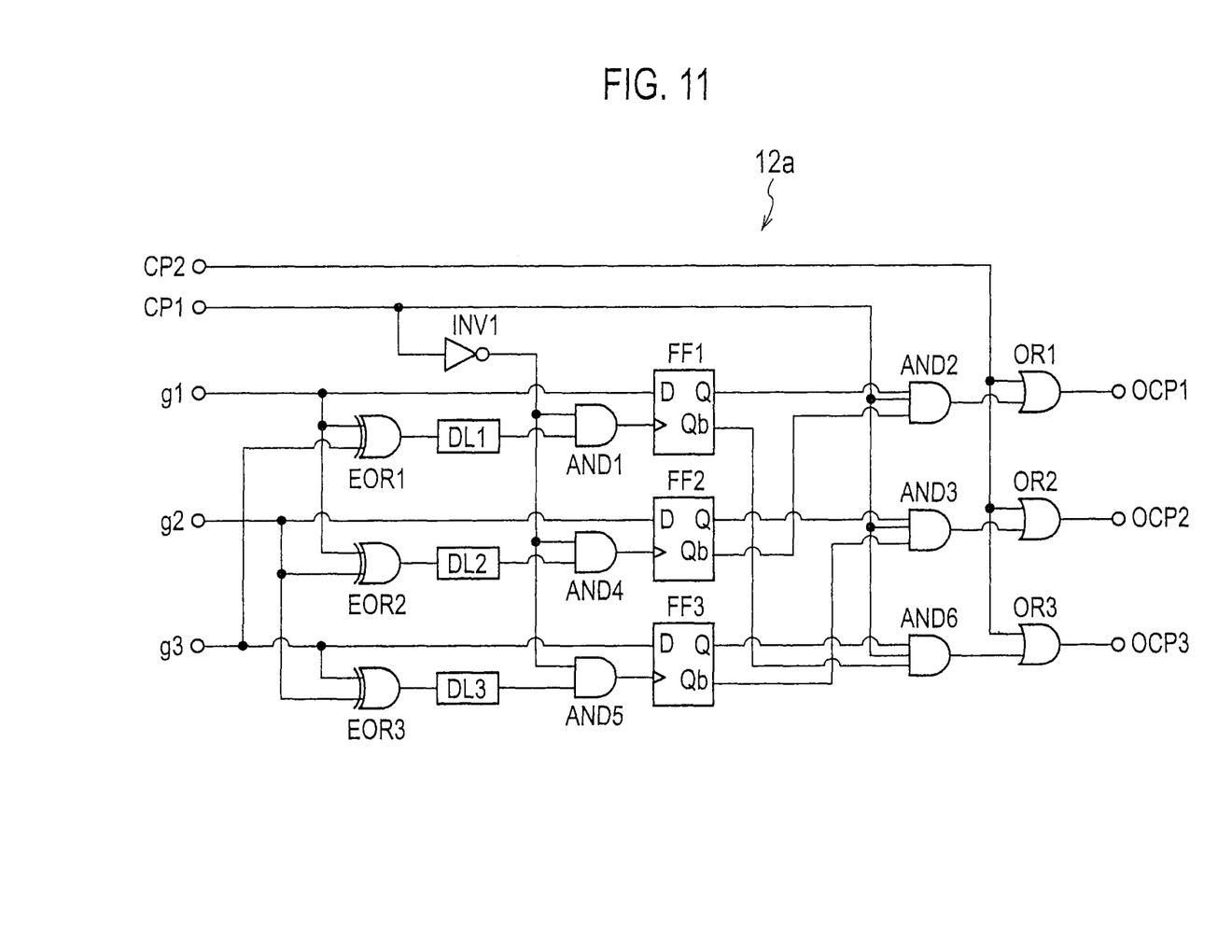
FIG. 11 is a circuit diagram illustrating a selector in the power source apparatus of Embodiment 2.

FIG. 11 is a circuit diagram illustrating a selector 12a in the power source apparatus of Embodiment 2. In FIG. 11, an exclusive OR (EOR) gate EOR1 finds an EOR of a first drive signal g1 for driving a first switching element Q1 and a third drive signal g3 for driving the third switching element Q3. An exclusive OR (FOR) gate EOR2 finds an EOR of the first drive signal g1 and a second drive signal for driving a second switching element Q2. An exclusive OR (EOR) gate EOR3 finds an EOR of the second and third drive signals g2 and g3.

A delay circuit DL1 delays an EOR output signal from the EOR1 by a predetermined time and outputs the delayed signal to a first input terminal of an AND gate AND1. A delay circuit DL2 delays an EOR output from the EOR2 by a predetermined time and outputs the delayed signal to a first input terminal of an AND gate AND4. A delay circuit DL3 delays an EOR output signal from the EOR3 by a predetermined time and outputs the delayed signal to a first input terminal of an AND gate AND5.

An inverter INV1 inverts an output signal from a comparator CP1 of an overcurrent detector 11 and outputs the inverted signal to second input terminals of the AND gates AND1, AND4, and AND5.

An output terminal of the AND1 is connected to a clock input terminal of a D-flip-flop FF1. A D-input terminal of the D-flip-flop FF1 receives the first drive signal g1. An output terminal of the AND4 is connected to a clock input terminal of a D-flip-flop FF2. A D-input terminal of the D-flip-flop FF2 receives the second drive signal g2. An output terminal of the AND5 is connected to a clock input terminal of a D-flip-flop FF3. A D-input terminal of the D-flip-flop FF3 receives the third drive signal g3.

An AND gate AND2 finds an AND of the output from the comparator CP1, an output Q of the D-flip-flop FF1, and an inverted output Qb of the D-flip-flop FF2. An AND gate AND3 finds an AND of the output from the comparator CP1, an output Q of the D-flip-flop FF2, and an inverted output Qb of the D-flip-flop FF3. An AND gate AND6 finds an AND of the output from the comparator CP1, an output Q of the D-flip-flop FF3, and an inverted output Qb of the D-flip-flop FF1.

An OR gate OR1 finds an OR of an output from a comparator CP2 and an output from the AND2 and outputs a first overcurrent detection signal OCP1. An OR gate OR2 finds an OR of the output from the comparator CP2 and an output from the AND3 and outputs a second overcurrent detection signal OCP2. An OR gate OR3 finds an OR of the output from the comparator CP2 and an output from the AND6 and outputs a third overcurrent detection signal OCP3.

Figure 12:
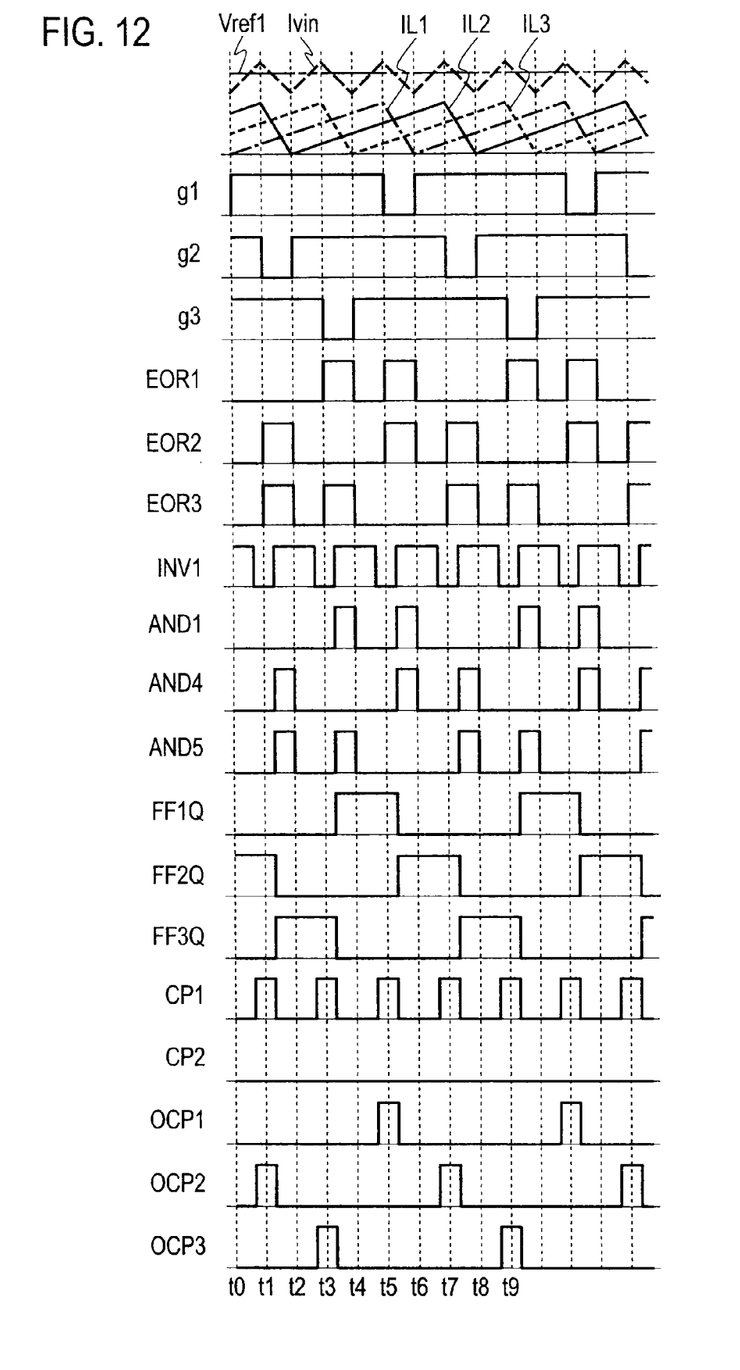
FIG. 12 is a view illustrating operating waveforms at various parts of the overcurrent detector and selector in the power source apparatus of Embodiment 2.

FIG. 12 is a view illustrating operating waveforms at various parts of the overcurrent detector 11 and selector 12a in the power source apparatus of Embodiment 2. In FIG. 12, a signal g3 is the third drive signal for driving the switching element Q3, EOR2 is an output signal from the EOR2, EOR3 is an output signal from the EOR3, AND4 is an output signal from the AND4, AND5 is an output signal from the AND5, FF2Q is an output signal from the D-flip-flop FF2, FF3Q is an output signal from the D-flip-flop FF2, FF3Q is an output signal from the D-flip-flop FF3, CP2 is an output signal from the comparator CP2, OCP1 is a first output signal from the selector 12a, OCP2 is a second output signal from the selector 12a, and OCP3 is a third output signal from the selector 12a. The other reference marks are the same as those of FIG. 8.

Operation of the various parts of the overcurrent detector 11 and selector 12a of Embodiment 2 will be explained with reference to FIG. 12. In FIG. 12, the ON duty ratio of each drive signal exceeds 50%. The converters have different phases from each other.

If one of the first and third drive signals g1 and g3 is active (for example, from t3 to t4, and from t5 to t6), the EOR1 outputs a high-level signal. Namely, if the first and third drive signals g1 and g3 provide pulses that do not overlap each other, the EOR1 provides an exclusive OR signal of high level.

The delay circuit DL1 delays the signal EOR1 by the predetermined time and provides the delayed signal DL1. The inverter INV1 inverts the output CP1 from the comparator CP1 and outputs the inverted signal INV1 to the AND1, AND4, and AND5.

The AND1 finds an AND of the inverted signal INV1 and the delayed signal DL1 and outputs the signal AND1. Namely, the signal AND1 is obtained by masking the delayed signal DL1 for an overcurrent detection period (a high-level period of the comparator output signal CP1). The signal AND1 is supplied to the clock input terminal of the D-flip-flop FF1.

The D-flip-flop FF1 stores a logical voltage state of the first drive signal g1 applied to the D-input terminal in synchronization with the signal AND1 applied to the clock input terminal.

Namely, the D-flip-flop FF1 outputs the state of the D-input terminal at the time of receiving the clock signal (the signal AND1) to the output terminal Q and an inversion of the state of the D-input terminal to the inverting output terminal Qb. According to the first and third drive signals g1 and g3, the D-flip-flop FF1 stores a period from when the third drive signal g3 falls to when the first drive signal g1 falls. Namely, if the output Q of the D-flip-flop FF1 is high, it indicates that the first drive signal g1 is or has been active longer than the third drive signal g3.

Similarly, if one of the first and second drive signals g1 and g2 is active (for example, from t1 to t2, and from t5 to t6), the EOR2 provides a high-level output. Namely, if the first and second drive signals g1 and g2 provide pulses that do not overlap each other, the EOR2 provides an exclusive OR signal of high level. The delay circuit DL2 delays the signal EOR2 by the predetermined time and provides the delayed signal DL2.

The AND4 finds an AND of the inverted signal INV1 and the delayed signal DL2 and outputs the signal AND4. Namely, the signal AND4 is obtained by masking the delayed signal DL2 for an overcurrent detection period (a high-level period of the comparator output signal CP1). The signal AND4 is supplied to the clock input terminal of the D-flip-flop FF2.

The D-flip-flop FF2 stores a logical voltage state of the second drive signal g2 applied to the ID-input terminal in synchronization with the signal AND4 applied to the clock input terminal.

Namely, the D-flip-flop FF2 outputs the state of the D-input terminal at the time of receiving the clock signal (the signal AND4) to the output terminal Q and an inversion of the state of the D-input terminal to the inverting output terminal Qb. According to the first and second drive signals g1 and g2, the ID-flip-flop FF2 stores a period from when the first drive signal g1 falls to when the second drive signal g2 falls. Namely, if the output Q of the D-flip-flop FF2 is high, it indicates that the second drive signal g2 is or has been active longer than the first drive signal g1.

Similarly, if one of the second and third drive signals g2 and g3 is active (for example, from t1 to t2, and from t3 to t4), the EOR3 provides a high-level output. Namely, if the second and third drive signals g2 and g3 provide pulses that do not overlap each other, the EOR3 provides an exclusive OR signal of high level. The delay circuit DL3 delays the signal EOR3 by the predetermined time and provides the delayed signal DL3.

The AND5 finds an AND of the inverted signal INV1 and the delayed signal DL3 and outputs the signal AND5. Namely, the signal AND5 is obtained by masking the delayed signal DL3 for an overcurrent detection period (a high-level period of the comparator output signal CP1). The signal AND5 is supplied to the clock input terminal of the D-flip-flop FF3.

The D-flip-flop FF3 stores a logical voltage state of the third drive signal g3 applied to the D-input terminal in synchronization with the signal AND5 applied to the clock input terminal.

Namely, the D-flip-flop FF3 outputs the state of the D-input terminal at the time of receiving the clock signal (the signal AND5) to the output terminal Q and an inversion of the state of the D-input terminal to the inverting output terminal Qb. According to the second and third drive signals g2 and g3, the D-flip-flop FF3 stores a period from when the second drive signal g2 falls to when the third drive signal g3 falls. Namely, if the output Q of the D-flip-flop FF3 is high, it indicates that the third drive signal g3 is or has been active longer than the second drive signal g2.

The output Q of each of the D-flip-flops FF1, FF2, and FF3 indicates priority between the adjacent two converters. The priority may overlap depending on the duty ratios of the drive signals of the converters.

For this, the AND2, AND3, and AND6 find ANDs of the outputs Q of the D-flip-flops FF1, FF2, and FF3 and the inverted outputs Qb thereof, to eliminate the priority overlap. At the same time, the AND2, AND3, and AND6 find ANDs with respect to the output from the comparator CP1, to provide the overcurrent state signals OCP1, OCP2, and OCP3 according to priority.

If the comparator CP2 in the overcurrent detector 11 detects an overcurrent state, all of the overcurrent state signals OCP1, OCP2, and OCP3 are outputted without regard to the output states of the D-flip-flops FF1, FF2, and FF3.

Figure 13:
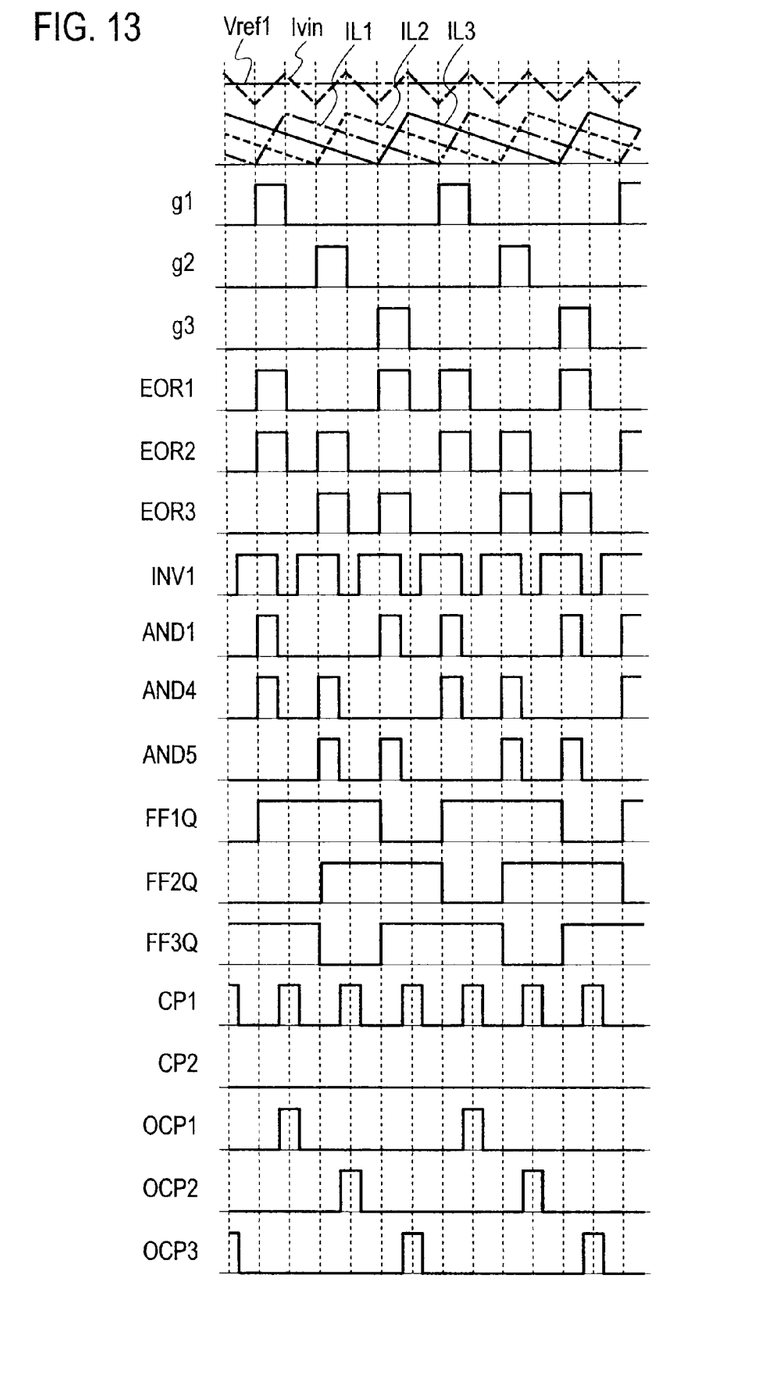
FIG. 13 is a view illustrating other operating waveforms at the various parts of the overcurrent detector and selector in the power source apparatus of Embodiment 2.

In this way, the power source apparatus according to Embodiment 2 is capable of handling an optional number of converters that are connected in parallel with each other, if properly constituting the selector 12a to select a converter to be stopped according to a resultant overcurrent signal and output an overcurrent state signal to the controller 13a at proper timing. The present embodiment needs not individually detect switching currents of the switching elements of the converters. The power source apparatus of the present embodiment, therefore, is manufacturable at low cost and stably carries out the overcurrent protective operation. FIG. 13 is a view illustrating operating waveforms at the various parts of the power source apparatus of the present embodiment when the ON duty ratio of each drive signal is smaller than 50%.

The present invention is not limited to the above-mentioned embodiments. The present invention is applicable to a power source apparatus having four or more converters, if properly constituting a selector based on the teachings of the embodiments.

According to Embodiments 1 and 2, the current detecting resistor R1 is connected between the input power source Vin and the ground. The current detecting resistor R1 may be connected between the switching elements and the ground, to detect currents passing through the switching elements.

According to Embodiments 1 and 2, the selector 12 (12a) provides outputs for the converters, respectively. Instead, the selector may provide an output for each converter group having a plurality of converters.

The current detecting resistor R1 used in Embodiments 1 and 2 may be replaced with a current transformer, wiring resistance, or a Hall element.

The step-up circuit in Embodiments 1 and 2 may be a step-down circuit, a buck-boost circuit, a flyback circuit, or a forward circuit.

As mentioned above, the power source apparatus according to the present invention employs a current detector to detect a resultant current of converters and a deactivate unit to deactivate a drive signal that is active longer than the other active drive signals. The power source apparatus of the present invention identifies a switching element that is in an active state for a longest period among operating switching elements and stops the operation of the identified switching element. The power source apparatus of the present invention is capable of reducing manufacturing costs and stably conducting the overcurrent protective operation even if the number of converters arranged in parallel with each other in the power source apparatus is increased.

The present invention is applicable to overcurrent protection for converters that are connected in parallel with each other and are operated at different phases.

This application claims benefit of priority under 35 USC §119 to Japanese Patent Application No. 2009-053211, filed on Mar. 6, 2009, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A power source apparatus comprising:
a first converter having a first reactor connected to a power source, a first switching element, and a first rectifying element;
parallel converters each having the same configuration as the first converter and connected in parallel with the first converter, the number of the parallel converters being at least one;
an output capacitor connected to output ends of the first and parallel converters;
a current detecting resistor configured to detect a resultant current of currents passing through the first and parallel converters;
a controller connected to the first and parallel converters and configured to output a first drive signal for driving the first switching element of the first converter and drive signals for driving the switching elements of the parallel converters; and
a deactivate unit configured to, in a case where the resultant current indicates a first reference value:
if one of the drive signals for the switching elements of the first and parallel converters is active, deactivate the active drive signal; and
if a plurality of the drive signals for the switching elements of the first and parallel converters are active, deactivate at least one of the active drive signals that is active longer than the other active drive signals.

2. A power source apparatus comprising:
a first converter having a first reactor connected to a power source, a first switching element, and a first rectifying element;
parallel converters each having the same configuration as the first converter and connected in parallel with the first converter, the number of the parallel converters being at least one;
an output capacitor connected to output ends of the first and parallel converters;
a current detecting resistor configured to detect a resultant current of currents passing through the first switching element and the switching elements of the parallel converters;
a controller connected to the first and parallel converters and configured to output a first drive signal for driving the first switching element of the first converter and drive signals for driving the switching elements of the parallel converters; and
a deactivate unit configured to, in a case where the resultant current indicates a first value:
if a plurality of the drive signals for the switching elements of the first and parallel converters are active, deactivate the active drive signals; and
if the drive signals for the switching elements of the first and parallel converters are active, deactivate at least one of the active drive signals that is active longer than the other active drive signals.

3. The power source apparatus of claim 1, wherein
if the resultant current indicates a second reference value that is different from the first reference value, the deactivate unit deactivates all of the drive signals for the switching elements of the first and parallel converters without regard to whether or not the drive signals are active.

4. The power source apparatus of claim 2, wherein
if the resultant current indicates a second reference value that is different from the first reference value, the deactivate unit deactivates all of the drive signals for the switching elements of the first and parallel converters without regard to whether or not the drive signals are active.

* * * * *